(12) United States Patent
Bitzer et al.

(10) Patent No.: US 6,263,262 B1
(45) Date of Patent: Jul. 17, 2001

(54) VEHICLE CONTROL SYSTEM

(75) Inventors: Rainer Bitzer, Weissach; Juergen Bauer, Leonberg; Udo Diehl, Stuttgart; Holger Bellmann, Ludwigsburg; Martin-Peter Bolz, Oberstenfeld; Rainer Mayer, Weil der Stadt; Uwe Maienberg, Stuttgart; Christian Grosse, Kornwestheim; Marko Poljansek, Reutlingen; Torsten Heidrich, Vaihingen/Enz, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,356
(22) PCT Filed: Jul. 1, 1999
(86) PCT No.: PCT/DE99/02022
   § 371 Date: Apr. 24, 2000
   § 102(e) Date: Apr. 24, 2000
(87) PCT Pub. No.: WO00/10850
   PCT Pub. Date: Mar. 2, 2000

(30) Foreign Application Priority Data

Aug. 24, 1998 (DE) .............................................. 198 38 337

(51) Int. Cl.[7] .................................................. G06F 17/00
(52) U.S. Cl. .................................................. 701/1; 701/36
(58) Field of Search .................................... 701/1, 40, 44, 701/57, 77, 98, 36, 70, 27, 48; 370/539, 541; 707/10, 201, 100, 103

(56) References Cited

U.S. PATENT DOCUMENTS

| 5,351,776 | 10/1994 | Keller et al. ........................ 180/79.1 |
| 5,367,456 | * 11/1994 | Summerville et al. ......... 364/424.02 |
| 5,513,107 | * 4/1996 | Gormley .......................... 364/424.05 |
| 5,692,186 | * 11/1997 | Fukuoka et al. ..................... 395/617 |
| 5,991,669 | * 11/1999 | Dominke et al. ......................... 101/1 |
| 6,092,006 | * 7/2000 | Dominke et al. ......................... 701/1 |

FOREIGN PATENT DOCUMENTS 196 37 209    4/1998   (DE) .

* cited by examiner

Primary Examiner—Tan Nguyen
Assistant Examiner—Dalena Tran
(74) Attorney, Agent, or Firm—Walter Ottesen

(57) ABSTRACT

A control system of a vehicle is suggested, which has several components (10 to 1014), which are arranged in different logical levels with at least one coordination component (14), which monitors the making available of power and the power requirement of at least one type of resource which is needed by at least two consumers, and with at least one component (101, 1011–1013) which makes the resource available, with at least two components (10, 12) which consume the resource; coordination components and consuming components are arranged in one logical level, characterized in that the component, which makes available the resource, is arranged in a subordinated level of a consuming component (10, 12) and the coordination component (14) inquires of the component, which makes available the resource, as to its power capacity with respect to the resource.

8 Claims, 2 Drawing Sheets

VEHICLE CONTROL SYSTEM

FIELD OF THE INVENTION

The invention relates to a control system of a vehicle.

BACKGROUND OF THE INVENTION

A control system of this kind is known, for example, from DE-AS 41 11 023 (U. S. Pat. No. 5,351,776). There, a control of the total vehicle is suggested at least with respect to drive train and brakes. The control has a hierarchal order structure for the control tasks. The control structure described there includes coordination elements which convert an order, which proceeds from a higher hierarchal level, into orders for elements of a subordinate hierarchal level. The contents of the orders define physical quantities which determine the interfaces between the individual hierarchal levels. The orders are transmitted from above to below in the hierarchal structure. The described interfaces orientate themselves to the physical conditions of the vehicle motion, especially of the drive train and the brakes. A view of a vehicle control which goes beyond, for example, while considering the chassis electronics and the on-board electrical system control is not described.

Because of the increasing networking of systems in the vehicle technology, which previously were independent, the exclusive view of the drive train and the brakes is no longer adequate. Rather, it is necessary to provide a control structure of the total vehicle with the aid of which also systems lying outside of the drive train control and the brake control can be linked and their tasks can be coordinated.

This task is achieved with the features of the independent patent claims.

A structure for a vehicle which satisfies these requirements is known from the SAE paper 980200 "CARTRONIC—An Open Architecture for Networking the Control Systems of an Automobile" by Torsten Bertram, Rainer Bitzer, Rainer Mayer and Asmus Volkart. The individual elements of a vehicle control are assigned to pregiven components in different detailing levels. Data are exchanged between these components in the context of predetermined communication relationships. In an uppermost detailing level, the following are provided: a central coordinator as well as the components: on-board electrical system, vehicle motion, chassis and interior as well as drive. These components are refined further in several levels respectively. For example, the component "drive" is subdivided into a coordinator, the engine, the clutch and the transmission. With respect to the distribution and the administration of the resources, which are available in the vehicle, as well as the consumers which consume these resources, the resource, which is common to the consumers, is, according to this structure, arranged on the same level with the consumers and the coordinator responsible for the resource. For example, the resource "drive", which is resource for the vehicle motion component as well as for the chassis and interior, is arranged in the first level.

SUMMARY OF THE INVENTION

The invention describes the administration and distribution of the resources which are available in the vehicle. Under resources, a power is understood which is made available by components (so-called sources) to other components (so-called sinks or consumers) for consumption. Examples of such resources are the resource "mechanical power" which is generated by the drive (engine, clutch, transmission) or the resource "electrical power" which is made available by the generator and the battery.

It is especially advantageous that a software component is installed at a central location. This software component monitors the power which is made available and the power consumption of the vehicle components. The strategy followed is applied centrally. If, for example, a requirement of power is determined which is too high at one operating point, then operating-point dependent, vehicle-specific power limitations are determined for the individual consumers or consumer groups in accordance with this applied strategy. The individual components then initiate corresponding measures such as the switchoff of individual consumers. This is done within this limitation in accordance with local criteria which the central component does not know. Stated otherwise, this means that the specific technical possibilities are applied locally and the central strategy is applied centrally so that a retroactive free exchange of software components is possible, for example, for a hardware change (use of other aggregates, et cetera).

It is especially advantageous that the resulting requirement of the consumers is summed by the software component which gives orders to the power source, and is converted into physical quantities such as torque or rpm while considering the boundary conditions which are present. In this way, larger software components stay operable in an autarchic manner and this leads to leaner programs for reduced or distributed function size and facilitates a distributed development and test of the individual components.

It is especially advantageous that the resource (for example, the engine-transmission unit), which is common to the consumers, is arranged in a consumer (drive/brake) of the component "vehicle motion". The coordinator (total vehicle coordinator), which is responsible for the administration and distribution of these resources, does not know the resource (only via the component "drive/brake"). In this way, a simpler, more vertical structure is made available having a reduced number of interfaces.

In an advantageous manner, the communication relationships can be reduced to request and inquiry relationships in the first detailing level between the coordinator "total vehicle" and the components which are arranged there; that is, no measures for forming specific orders are to be provided in the coordinator.

In this embodiment too, the modular detailing of the structure for changed function size remains constant. Changed orders have only additional communications or communications which drop away as a consequence.

In comparison to the structure introduced in the above-mentioned SAE paper, the structure described hereinafter is invariant with respect to added consumers or consumers which drop away because the coordinator must not inexorably be arranged on the same detailing level as the source and the consumer.

Furthermore, it is advantageous that the resource administration is understandable and can be integrated simply into the structure of the total vehicle. In an advantageous manner, this leads to a total architecture of the total vehicle having a free optimizable hardware topology.

It is especially advantageous that the resource administration and resource distribution can be arranged independently and thereby offers the possibility to reuse already tested software modules having standardized physical interfaces.

Furthermore, an understandable total power management is made possible having less interfaces and components which are substantially independent of each other. In this way, a good exchangeability of components results which can be developed and tested independently of each other because of the few defined interfaces.

BRIEF DESCRIPTION OF THE DRAWINGS

The invention will be explained in greater detail in the following with respect to the embodiments shown in the drawing.

DESCRIPTION OF THE PREFERRED EMBODIMENTS OF THE INVENTION

Figure 1:
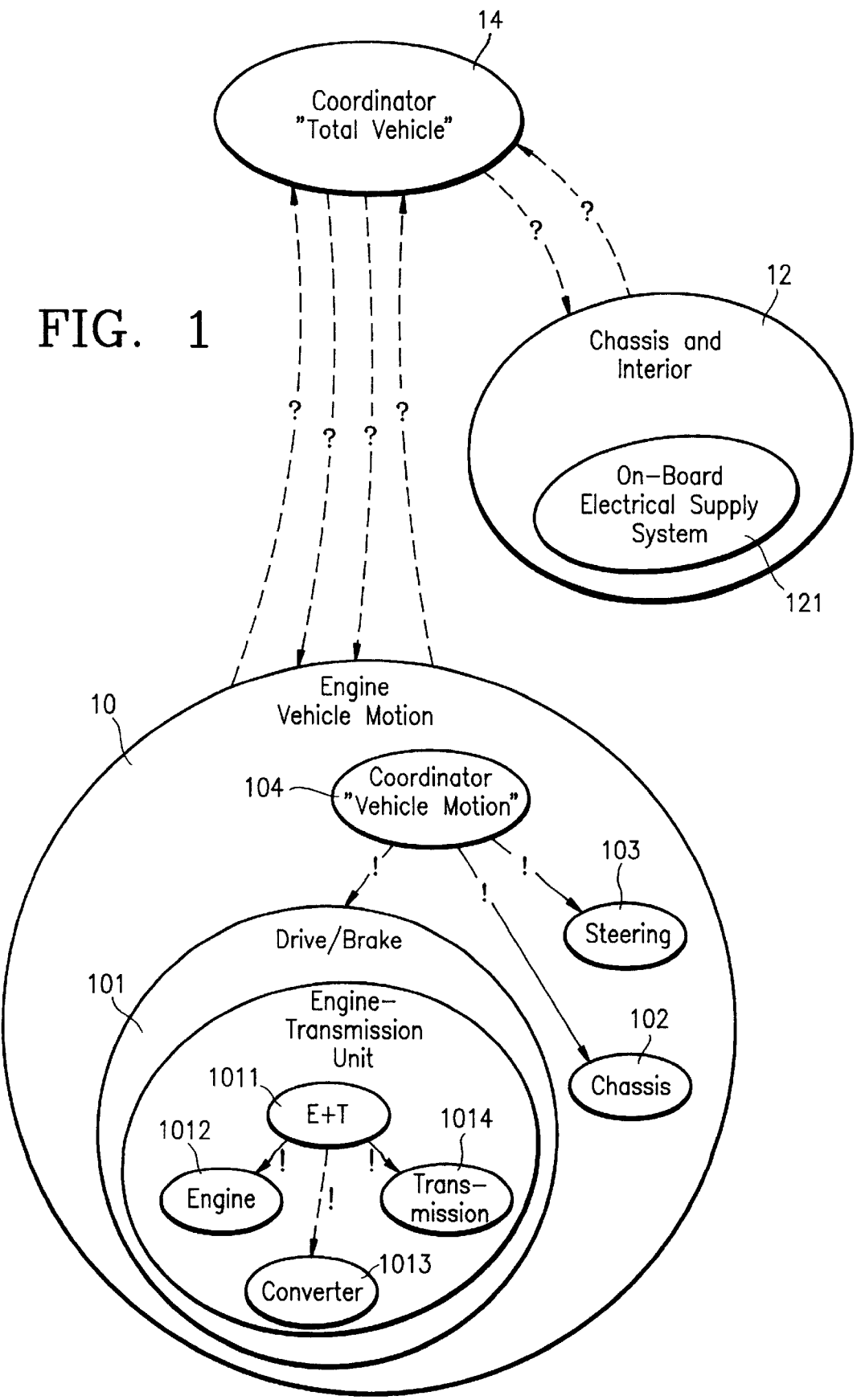
FIG. 1 shows the described resource administration and distribution in general form on the example of the component "vehicle motion"; whereas, in FIG. 2, the communication between individual levels is shown based on the example of the component "vehicle motion". The solution described in the following is realized in at least one computer element. The distribution of the individual components can take place in any desired manner to different computer elements or only to one computer element. The software structure illustrated is independent of the specific hardware realization in this case.

FIG. 1 shows the structure of the invention for the control of motor vehicle components which includes all tasks in the vehicle region, in the embodiment of the control of the vehicle motion. The structure satisfies the increased requests for a motor vehicle control with respect to comfort, safety and consumption and the closed coupling of the individual components. The structure can be imaged on any desired hardware topology. The example of FIG. 1 defines the control of the components of the drive train which, for the total vehicle, is a significant source of the mechanical power which is consumed by the different systems. For this reason, requests with respect to a vehicle-wide administration of this energy source occur for the control of the drive train. FIG. 1 defines a software structure for the resource administration and resource distribution in a vehicle control.

The components of a vehicle are represented by corresponding components (so-called software objects) within the corresponding control software. Examples of components of this kind are the controls as well as the actuators for the engine, the converter, the transmission, the chassis, the steering, et cetera. Supplementary, there are components (objects), which realize control tasks (for example, the coordination of the engine-transmission unit, coordination of the vehicle motion, coordination of the total vehicle, et cetera) and components (objects) which make available data of general interest (for example, sensors, estimators, et cetera). Several components of any desired type can be grouped together to more abstract components, for example, components: "vehicle motion", "chassis and interior", et cetera. This modularization is orientated to the mechanical and electrical components, assemblies and functional units present in the vehicle.

In the uppermost detailing level of the structure shown in FIG. 1 are the following: the vehicle control in addition to several data transducers (not shown), the component 10 for the control of the vehicle motion, the components for the elements of the chassis and the interior 12 as well as a coordination component 14 (total vehicle coordinator). The total vehicle coordinator monitors, inter alia, the making available of power and the power requirement of resources needed over the whole vehicle, for example, the mechanical power of the engine and the electrical power of the on-board electrical system. All communications in the uppermost detailing level lead in the individual components to further communications and/or to the execution of actions. This is shown in FIG. 1 with respect to a detailing of a component "vehicle motion" 10. The next detailing level of this component includes control system 101 for the drive and the brake, for the chassis 102 and for the steering 103. In addition, in this detailing level, there is a coordinator 104 provided for the vehicle motion which, corresponding to the coordinator for the total vehicle, administers the resources needed for this detailing level, maintains the communications with the total vehicle coordinator 14 and provides the communications with the components 101 to 103. In the next detailing level, which is correspondingly configured for the chassis and the steering, the component "drive/brake" is shown in the example of the engine-transmission unit. In this detailing level there is also a coordinator 1011 and a control object 1012 for the engine and a control object for the torque converter 1013 and a control object for the transmission 1014. Communication relationships between the control objects and the coordinator or between the total component and the vehicle motion coordinator 104 are shown. The component "chassis and interior" is detailed correspondingly.

What is essential in the structure sketched in FIG. 1 is that the resource "engine-transmission unit" of the mechanical power is arranged in a consuming component of this power (components "vehicle motion", there, "drive/brake"). The resource "engine-transmission unit" is common for the total vehicle (propulsion, deceleration, generation of electric power, et cetera). Therefore, the resource is not known to the coordinator 14 which distributes and administers the resource "mechanical power". Resource and coordinator are therefore on different levels.

Orders are pregiven as communication relationships between individual components, for example, between the objects 101 to 103 and the coordinator 104. The adjustment of a specific power or other physical quantities by the receiver of the order is pregiven via the communication relationships. In addition, inquiry relationships for obtaining data are provided via which, for example, the coordinator 14 inquires as to the power requirement for electrical power of the component "vehicle motion". A third communication relationship is the request relationship via which command desired quantities are transmitted which should be adjusted by the requesting component. In the first detailing level, one can omit the order relationships (see also below) because of the suitable arrangement of the components in the first detailing level.

Figure 2:
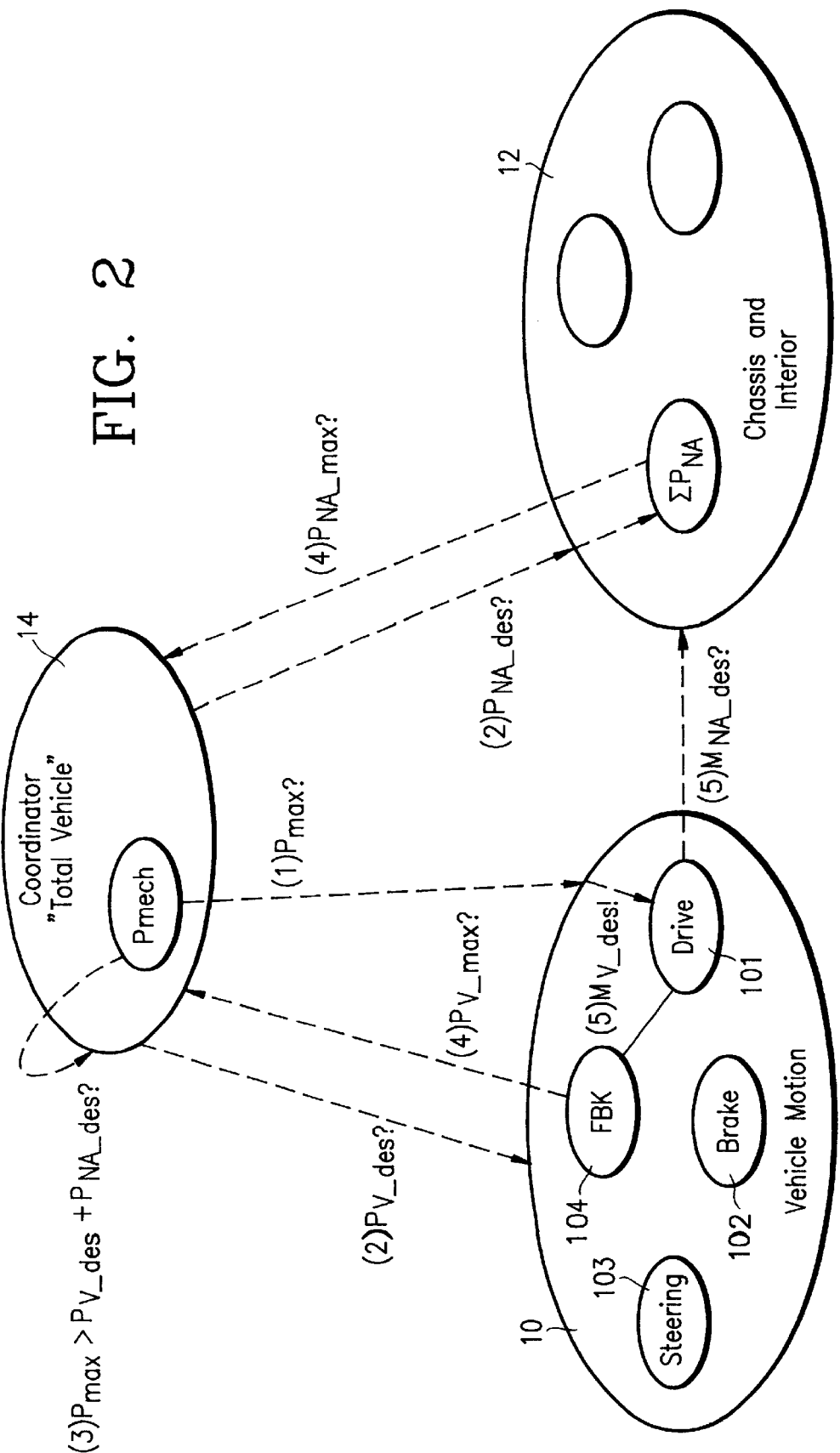

In FIG. 2, the communication between the components of the detailing level shown in FIG. 1 is described. This concerns the communication of the coordinator "total vehicle" 14 with the components assigned thereto. These components are "vehicle motion" 10 and "chassis and interior" 12. In the embodiment shown, the resource "mechanical power" is administered which is arranged in the component "drive" on a subordinated detailing level. The engine or the drive train 101 is assumed as the only source. If further sources are present for the mechanical power, then the communication is duplicated and the values in the coordinator "vehicle movement or total vehicle" are added.

The coordinator for each type of resource (for example, Pmech) is a subcomponent of the coordinator "total vehicle" and coordinates the distribution of the power as follows. Each coordinator inquires of all components (10, 12) of the first detailing level their actual maximum contribution (Pmax) to the respective power availability (communication connection 1). This inquiry is transmitted in the detailing level "vehicle motion" to component "drive" 101 and is answered by the latter. Each component (for example, component "brake" in the detailing level "vehicle motion") of a detailing level has, for each type of resource, a collector (for example, ΣPNA) which determines the power requirement of the consumers of this component. The power requirement is, if needed, summed in several different prioritized subquantities. The coordinator of the total vehicle inquires from each component of the first detailing level its power requirement PV_Des, PNA_Des (communications connection 2). The corresponding power requirement value is made available by the respective collector and supplied to the coordinator of the total vehicle. The result is a power requirement value supplied by each component (10, 12) to the coordinator "total vehicle" 14. The coordinator checks as to whether the total power requirement (that is, the sum of the power requirement values supplied by the components), exceeds the summed power capacity Pmax of the resource (communication relationship 3). In this case, the coordinator computes a maximum permissible consumption for each component of its detailing level from the operating state, the priorities, and a strategy fixed in the specification. The coordinators of the components inquire at the resource coordinator this limitation (communication relationship 4) and reduce, as required, the local requirements (for example, switching off the climate control compressor) via their own strategy. The coordinators of the components formulate the requests under these boundary conditions for the sources assigned to them in physical clear form, such as, a desired torque MV_Des for the component "drive" (communication relationship 5). The additional requirement is inquired from other components MNA_Des as required and is considered (see communication relationship 5). The component "drive" then adjusts the requested torque so that the coordinator "total vehicle" can distribute the resource in correspondence to the requests of the components.

A corresponding procedure is also utilized with reference to other resources, for example, with reference to the electrical and/or thermal power.

What is claimed is:

1. A control system of a vehicle, comprising:

several components (10 to 1014) arranged in different logical levels;

said several components (10 to 1014) including a coordinator (14) for the entire vehicle, which monitors the need and the making available of resources required throughout the vehicle;

said several components (10 to 1014) further including additional components (10, 12) with at least one of said additional components (10, 12) including a coordinator (104) which administers the resources needed in those additional components (10, 12) and which communicates with said coordinator (14) for the entire vehicle and components (101 to 103) of the next level of said additional components (10, 12); and, said components (101 to 103) of said next logical level including sources and consumers of said resources generated by said source.

2. The control system of claim 1, wherein the coordinator (14) is arranged in an uppermost logical level for the total vehicle and the additional components (10, 12), which consume the resources, are components for controlling the vehicle motion and for controlling the chassis and the interior.

3. The control system of claim 2, wherein the component, which makes available the resource, is an engine-transmission unit as source of mechanical power of the vehicle system, which is arranged within the logic level "drive/brake" of the component for controlling the vehicle motion.

4. The control system of claim 3, wherein the coordinator (14) inquires of all of said additional components (10, 12) of its detailing level as to their actual requirement of the resource (PV_Des, PNA_Des).

5. The control system of claim 4, wherein the coordinator determines a maximum permissible consumption (PV_max, PNA_max) of the resource from the power requirement for each component of its detailing level.

6. The control system of claim 5, wherein the components inquire as to this value.

7. The control system of claim 1, wherein each component is provided with a coordinator which emits orders to the component making available the resource for making available the resource in dependence upon the maximum permissible consumption.

8. The control system of claim 7, wherein the resource is the mechanical power, the values pregiven or inquired by the coordinator are power values and the order represents a torque value.

* * * * *